Jan. 13, 1959     K. A. L. ÅKERMAN ET AL     2,868,060
SPECTROPHOTOMETER
Filed March 22, 1954
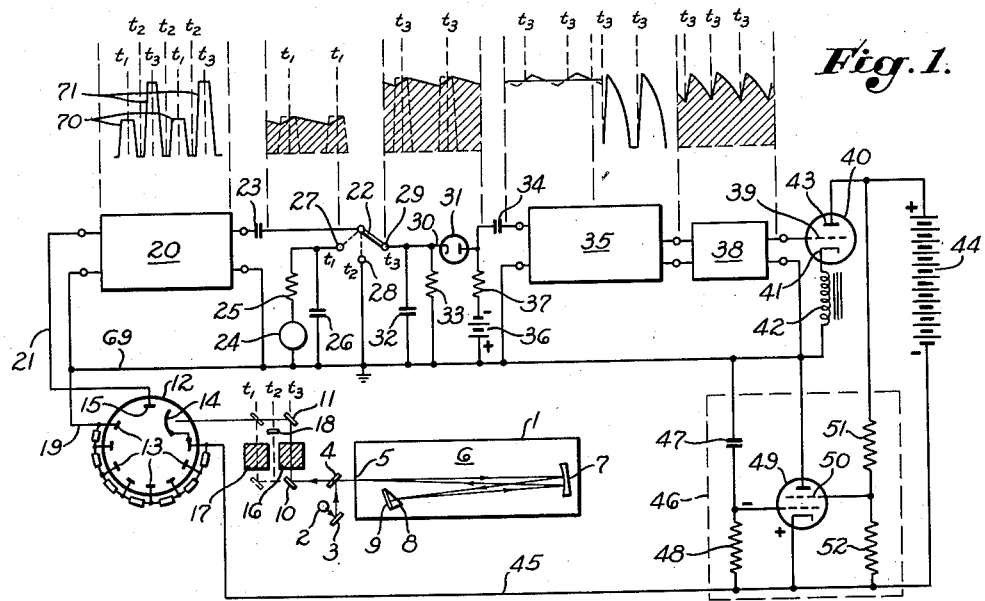
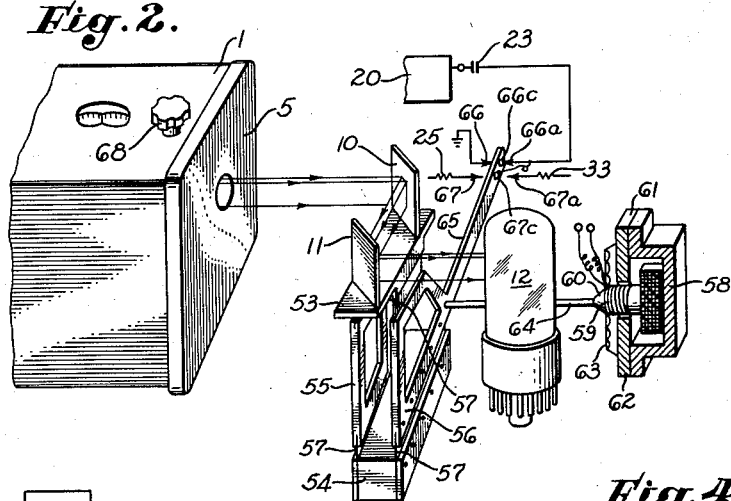
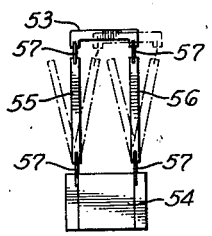
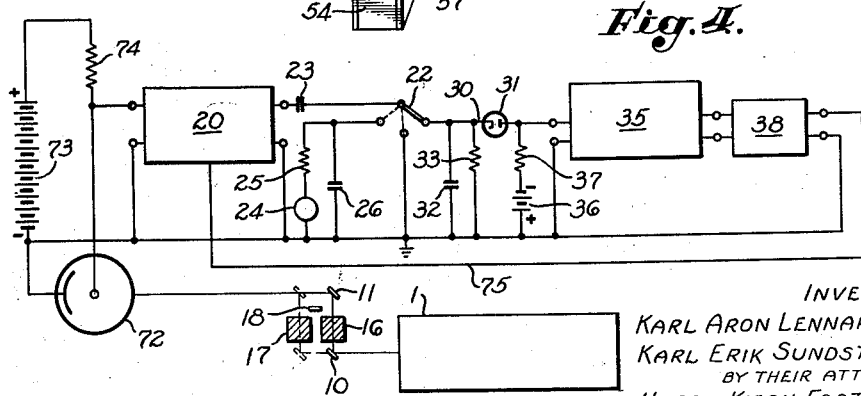
INVENTORS.
KARL ARON LENNART ÅKERMAN
KARL ERIK SUNDSTRÖM
BY THEIR ATTORNEYS.
HARRIS, KIECH, FOSTER & HARRIS

United States Patent Office 2,868,060
Patented Jan. 13, 1959

---

2,868,060

SPECTROPHOTOMETER

Karl Aron Lennart Åkerman, Stockholm, and Karl Erik Sundström, Solna, Sweden, assignors to Beckman Instruments, Inc., South Pasadena, Calif., a corporation of California Application March 22, 1954, Serial No. 417,782

Claims priority, application Sweden April 1, 1953

15 Claims. (Cl. 88—14)

The present invention relates particularly to a spectrophotometer of the type in which a light ray is subjected alternately to the action of a reference object and an object or specimen to be measured, and the intensity of the light emitted by the specimen is determined by means of a photoelectric cell or similar device adapted for converting luminous impulses into electrical impulses, and a measuring device connected to the photoelectric cell. The intensity values at different luminous frequencies are usually recorded in the form of a curve on a recording paper strip advanced in synchronism with the change of luminous frequency in the monochromator. Preferably, in spectrophotometers of the type to which this invention relates, the means for applying radiation alternately to a reference and sample object is positioned outside the exit slit of the monochromator whereby said radiation is substantially monochromatic, and whereby after traversing the sample or reference, the radiation is directed to a photoelectric cell or the equivalent. Alternately, however, these means may be positioned at the entrance slit of the monochromator whereby a beam of undispersed radiation from the source is caused to act alternately upon a sample and a reference and is thereafter directed into the monochromator entrance slit. In this case the monochromatic beam emerging from the monochromator exit slit may fall directly upon the photoelectric cell. In both cases the spectrophotometer as a whole acts identically to determine the transparency or reflectance of a specimen object at desired wavelengths or over a desired wavelength range.

It is especially useful to obtain a record automatically in terms of percent transmission or percent absorption of a specimen, that is, the ratio of the light transmitted (or absorbed) to the light incident on the sample. Unless special provisions are made, spectrophotometers of the type above referred to require that the ratios of values from two separate curves be worked out at suitable intervals through the wavelength region of interest, viz, one curve indicating the measured values and the other indicating the reference values. In order to obtain the characteristic percent transmission or absorption curve of a specimen the curves recorded will have to be transformed by the aid of special arrangements into one single curve in which the ordinate values are plotted as the ratios between the corresponding ordinate values of the two original curves. The combination curve thus obtained will then represent the measured values related to the corresponding reference values varying with the luminous frequency or wavelength. In determining said reference values it is found that far from being constant they vary markedly as the result of several factors which change with wavelength. These are especially (1) variation of the output energy of the monochromator source, (2) variation of transparency and reflectance of the monochromator optics, (3) variation of transparency or reflectance of the reference object and (4) variation of sensitivity of the photoelectric cell.

In accordance with the present invention the inconvenience and possible inaccuracies referred to are obviated by measuring the intensity of the light emanating from the measured specimen in relation to a stable reference value which is independent of the varying frequencies of the light. For this purpose the spectrophotometer is provided with adjustment means causing an automatic voltage control to be effected in the circuit of the measuring device during the reference period in such a manner that the output voltage of the photoelectric cell, or the voltage transmitted to the measuring device, will be adjusted to a value which is independent of the luminous intensity. This voltage control during the reference period is maintained during the subsequent measuring period whereby the intensity of the light emanating from the specimen will be measured in relation to a stable reference value. Accordingly, as it is constructed as a recording apparatus, the measuring device will record a curve accurately representing the proportion of transmitted or reflected light corresponding to different luminous frequencies as obtained relative to a constant reference level, i. e., to a reference line extending in parallel relation to the abscissa, usually a so-called "100 percent line." In this manner the measuring device will record directly the curve characteristic of the specimen being measured.

The specimen or object of the measurement usually consists of a liquid solution the transmittance or absorbance of which is to be measured, the reference object being most commonly formed by the solvent as a reference liquid, or being merely an air path. Thus, by means of a spectrophotometer according to the present invention different solutions, or different concentrations of one specific solution, may be analyzed or determined, respectively, by a direct comparison between curves of measurement. It will also be possible, however, to utilize the invention for measuring the reflectance factor of surfaces of different character in which case, in an analogous manner, the light reflected is measured by being compared with the light deflected from a reference surface.

The invention will now be described more in detail in conjunction with the accompanying drawings in which:

Fig. 1 illustrates a circuit diagram pertaining to a spectrophotometer according to a preferred embodiment of the invention.

Fig. 2 is a perspective representation of the light shifting mechanism and associated components.

Fig. 3 is a diagrammatic view of the mirror carrying cradle.

Fig. 4 illustrates a circuit diagram pertaining to a second embodiment of the invention.

Referring to the drawings, and more specifically to Fig. 1 thereof, the monochromator 1 of the equipment is illustrated purely diagrammatically. The light emitted by the light source 2, which may be a conventional filament bulb, is reflected by mirrors 3, 4 onto a slit plate 5 provided with a light slit through which a narrow ray of light is passed into a closed chamber 6 within which the light is reflected from a concave mirror 7 and into a prism 8 having a mirror coating 9. The light dispersed in the prism and reflected from the coating 9 will be focussed back by the mirror 7 and fall on the interior surface of the slit plate 5, the arrangement being such as to cause a different portion of the said light slit to pass a portion of the spectrum corresponding to the slit width. The rays of light reflected out through the slit will be reflected by two mirrors 10, 11 to the light entrance opening of a photoelectric cell 12 which, in the embodiment illustrated, consists of a photomultiplier conventionally built up of a plurality of dynodes 13 and having disposed within its light entrance opening a cathode 14 and a collecting electrode 15.

The two mirrors 10 and 11 are mounted on a common carrier member which is movable back and forth in a direction perpendicular to the path of the light rays between the mirrors 10, 11 enabling the latter to be adjusted into two alternate positions one of which is indicated in full and the other in broken lines. In the path of the light rays between the mirrors a reference object 16 and an object or specimen, to be measured, 17, are introduced, said objects consisting, in the example illustrated, of glass cells or cuvettes containing different liquids. The reference cuvette 16 may contain, for example, pure water, while the specimen cuvette 17 contains the solution the transmitted or absorbed energy of which is to be measured relative to the corresponding transmitted energy of the water in the reference cuvette. The two cuvettes are so disposed between the mirrors 10, 11 that the specimen cuvette is situated in the path of the light rays therebetween when in the position $t_1$, and the reference cuvette is situated in the path of the light rays between the mirrors when in the position $t_3$. Upon shifting the mirrors from one position into the other the mirrors will pass through an intermediate position $t_2$ in which the light rays are completely screened off by a shield 18.

The final dynode of the photomultiplier is connected to ground through a conductor 19 while the collector 15 is connected through a lead 21 to one input terminal of an instrument amplifier, the other terminal of this amplifier being grounded through a lead 69. The output terminals of the instrument amplifier are connected one to ground and the other, through a capacitor 23, to a change-over switch 22. The instrument amplifier 20 is adapted to amplify into a suitable magnitude the voltage impulses produced by the luminous impulses at the collecting electrode 15 in the photomultiplier, it being of importance that the amplification should be effected without distortion of the impulses. To this end it is preferred to use a so-called wide-band amplifier. The change-over switch 22 may comprise a rotatable contact arm or wiper or preferably an oscillatory or vibratory contact arm mechanically interconnected with the shifting mechanism for the mirrors 10, 11 so as in either instance to be adjusted in synchronism with said mechanism into three alternate positions corresponding to the positions $t_1$, $t_2$, $t_3$. In the position $t_1$, a measuring device 24 is connected through a resistor 25 to one output terminal of the instrument amplifier 20 via the capacitor 23, the measuring device 24 and resistor 25 being then in common connected in parallel with a capacitor 26. In the position $t_1$ of the change-over switch 22 both of the parallel branches are connected between ground, on one hand, and a contact stud 27 on the other. In the intermediate position $t_2$ of the change-over switch 22 the wiper, and thus the capacitor 23, are grounded through a contact stud 28. In the position $t_3$ the wiper 22 is connected through a contact stud 29 and a lead 30 to the cathode of a diode 31. A capacitor 32 and a resistor 33 are connected in parallel between the lead 30 and ground. The capacitor 32 has a capacitance value equal to that of capacitor 26, and the resistance value of resistor 33 desirably is equal to that totalled by the measuring device 24 and resistor 25.

The anode of the diode 31 is connected through a capacitor 34 to one input terminal of the control amplifier 35 and the other input terminal of which is connected to ground. The output circuit of the diode contains a grounded battery 36 and a series resistor 37. The control amplifier 35 is adapted to amplify to a suitable magnitude the A. C. components of the rectified voltage impulses. The output terminals of the control amplifier have connected thereto a rectifying arrangement 38 having one of its output terminals connected to ground and the other to the control grid 39 of a thermionic tube or valve 40 the cathode 41 of which is connected to ground through a choke coil 42. The anode 43 is connected to the positive terminal of a D. C. source 44 the negative terminal of which is connected to a lead 45 which, in its turn, connects to the cathode 14 of the photomultiplier. Thus it will appear that the valve 40 is connected in series with the dynode chain 13 of the photomultiplier, and that both will be traversed by D. C. from battery 44. Valve 40 will then function as a variable series resistor operating to adjust the operating voltage supplied to the photomultiplier and acting between the cathode 14 and the grounded final dynode thereof.

In parallel across the dynode chain of the photomultiplier a capacitively acting reactance tube circuit arrangement is inserted consisting of the various circuit elements within the rectangle indicated in broken lines 46, viz. a capacitor 47 and a resistor 48 connected in series between ground and the lead 45, and a screen-grid tube 49 the screen grid of which is connected to a point of interconnection between two resistors 51 and 52 inserted in series between the lead 45 and the anode 43 of the thermionic tube or valve 40. The reactance tube circuit arrangement thus described will act as a virtual capacitance varying with the changes in the input voltage in such a manner that the capacitance represented by this circuit arrangement will vary proportionally with the change in the input voltage.

The measuring device 24 is preferably of the recording type having an electrically controlled stylus the excursion of which is proportional to the voltage supplied to the change-over switch 22 while in position $t_1$ whereby the excursions will be recorded in the form of a continuous graph on a recording medium which is advanced in synchronism with the variations in the luminous frequency in the monochromator. The advancing mechanism may, for instance, be connected to the means associated with the monochromator which turns the prism 8 about an axis parallel with its reflecting surface 9 in such a manner as to cause the point marked on the recording medium or paper to correspond, at any moment, to a predetermined luminous frequency of the spectrum. The monochromator may be manually operable, or it may be operated by power driven means. The recording paper of the measuring device is suitably advanced continuously by a motor adapted to be driven in synchronism with the adjustment or operating means of the monochromator.

Referring now to Fig. 2, the shifting mechanism illustrated therein comprises the two mirrors 10 and 11 vertically mounted in spaced-parallel interrelation on a platform or carrier plate 53 which, through a parellelogram linkage, is movably connected to a base 54. The linkage connection is illustrated in its principles in Fig. 3. It consists of two frame members 55, 56 connected at their upper and lower ends to the plate 53 and base 54, respectively, by leaf springs 57 extending along the corresponding frame edges. In Fig. 3 the linkage is illustrated in full lines in an intermediate position corresponding to $t_2$ and in broken lines in each one of the two outer limit positions corresponding to the positions $t_1$ and $t_3$ in Fig. 1. During the reciprocating movement of the mechanism the plate 53 will always be maintained in its horizontal position, that is, will be shifted without being rotated.

The plate 53 together with the frame members 55, 56 form a cradle-like structure adapted to be rocked into its two extreme positions by an electro-dynamic oscillator 58 which may be of a construction somewhat similar to that of the operating system of a loudspeaker. The operating coil 59 movable in the magnetic field may be connected to a source of direct electric current through a periodically operating interrupter. It may be more suitable, however, to connect the same to, for example, a 50 or 60 cycle A. C. supply in which case the cradle will be oscillated at the periodicity of the A. C. The coil 59, in a well-known manner, is disposed on a bobbin 60 movable in the magnetic field and being, in its turn, mounted on the pole-pieces 61, 62 by means of a flexible diaphragm-like centralizing member 63. From the centre of the bobbin 60 a rod 64 projects in the direction of movement of the driving coil and is articulated to the frame member 56 so as to transmit the oscillatory movement of the coil to the shifting mechanism. From the frame member 56 a contact operating arm 65 is extended adapted to control the change-over switch 22 of Fig. 1, said switch being represented in Fig. 2 by a plurality of paired contact elements 66, 66a and 67, 67a, the contact elements of each pair being on opposite sides of the contact operating arm 65 which may carry buttons 66c and 67c insulated therefrom. Contact element 66 may be grounded and contact element 66a connected to the button 67c and to the output capacitor 23 of the amplifier 20. Contact elements 67 and 67a may represent the contact studs 27 and 29 of Fig. 1, being connected respectively to the resistors 25 and 33. When in position $t_2$, the contact elements 67 and 67a are each spaced from the button 67c but the contact elements 66 and 66a engage opposite sides of the button 66c, thus connecting to ground the output capacitor 23 of the amplifier 20. When moving to position $t_1$ the button 66c separates from 66a, thus removing the grounded connection of the amplifier 20, and button 67c later engages contact element 67 to connect the output capacitor 23 of the amplifier to the resistor 25 and the measuring device 24. When moving to position $t_3$ from $t_2$, the button 66c first separates from the contact element 66 and the button 67c then engages the contact element 67a to connect the output capacitor 23 to the resistor 33 and the diode 31. It will thus be apparent that the contact elements 66 and 66a respectively follow the rightward and leftward movements of the operating arm 65 for only limited distances and then separate from the button 66c during the continuance of movement of the arm 65 to permit engagement of the contact elements 67a and 67 respectively. The contact elements 66 and 66a may be mounted on biased or spring-metal arms with suitable stop means limiting their movement in the direction of their bias.

Through a slit opening in the end wall 5 of the monochromator light is emitted to the photomultiplier 12 after having been reflected by the mirrors 10, 11 in the manner described in the foregoing with reference to Fig. 1. The image of the spectrum projected on the slit plate may be displaced laterally in either sense by turning the prism 8 by means of the operating knob 68.

The operation of the assembly thus far described is as follows: The monochromator 1 is presupposed to be set to a predetermined luminous frequency, the corresponding light ray passing in the first moment through the reference cuvette 16 to be caught up by the cathode 14 of the photomultiplier. The voltage output then produced at the electrode 15 is amplified by the amplifier 20 and gives rise to an A. C. impulse which through capacitor 23 is transmitted to the change-over switch 22 in position $t_3$. This impulse charges the capacitor 32 which will subsequently discharge through resistor 33. The combination 32, 33, as well as the combination 24, 25, 26 is so proportioned as to cause the capacitor not to be completely discharged between any two subsequent impulses. This will cause a D. C. voltage pulsating in synchronism with the reference impulses to appear in the conductor 30. By means of battery 36 and resistor 37 the diode 31 has been given a suitably dimensioned stable threshold value and thus will only pass the peaks of the pulsations if the direct current voltage has an average value which is sufficiently high. If this is the case, then the reference impulse will be passed through the capacitor 34 to the control amplifier 35 in which the impulse is amplified and then fed into the rectifier 38 by which the same is rectified and applied to the grid 39. The voltage applied to the control grid 39 will cause a corresponding control of the photomultiplier circuit, notably the operating voltage thereof. At the same time, the reactance circuit arrangement 46 will be actuated thereby so as to introduce a capacitance value corresponding to the control, the arrangement being such as to cause the discharge per unit time to be maintained substantially unchanged for varying operating voltages of the photomultiplier.

Upon the subsequent shifting of the mirrors 10 and 11 into position $t_1$, the change-over switch 22 will be simultaneous shifted into its position $t_1$ whereby the measuring device 24 is connected into the measuring circuit connected to the collecting electrode 15. The voltage impulse then produced by the luminous impulse will cause charging of the capacitor 26 which will thereafter discharge through the resistor 25 and the measuring device 24 whereby the stylus will be moved into a position corresponding to the intensity of the luminous impulse. In this instant the control amplifier is disconnected, but the reference impulse rectified by the rectifier 38 during the preceding reference period will not disappear immediately but will decrease with a certain amount of time delay during which the negative potential existing on the grid 39 will increase correspondingly in the positive-going sense, while, by the action of the reactance tube circuit 46, the potential of the lead 45 will be maintained substantially at its value as obtained during the reference period in that the voltage increase across the photomultiplier caused by the tube 40 will counteract the discharge in the reactance tube circuit arrangement 46. It is true that a certain degree of discharge and a consequent voltage decrease causing a lowering of the operative voltage of the photomultiplier is inevitable, but owing to the reactance tube circuit the decrease thereof per unit time will be maintained constant at all voltage values. However, since the luminous shifting operation occurs very rapidly, the operative voltage of the photomultiplier during the measuring period will be practically the same as it was during the preceding reference period. This will cause the ratio of the intensity value of the ray of light emanating from the specimen to the intensity value of the light emanating from the reference object to equal the ratio of the electron emissions produced by the said light rays in the photomultiplier. The same ratio will exist between the potentials produced at the collecting electrode 15. However, since the branch circuits 24, 25, 26 and 32, 33, respectively, which are alternately introduced and disconnected by the change-over switch 22, have equal impedance values, it will be seen that also the voltages at the change-over switch corresponding to the luminous oscillations will be similarly interrelated as the intensity values of the light rays. The voltage existing at the change-over switch 22 during the reference period will thus form the reference value in relation to which the luminous intensity is measured during the measuring period while the voltage existing at the switch 22 during the measuring period is the actually measured value of the said luminous intensity. In consequence, the excursion of the stylus of the measuring device will give an accurate recording of the ratio of luminous intensity transmitted by the sample specimen to that transmitted by the reference.

When during the next succeeding reference period the change-over switch is placed in the contact position $t_3$ the above-described operation will be repeated, and since the luminous frequency is still the same there will be no changes in the voltage control circuits. During the following measuring period, during which the switch 22 is placed in the contact position $t_1$, the measuring device will have a fresh impulse applied to it under conditions similar to those just described, the luminous intensity being measured while maintaining the operative voltage of the photomultiplier.

The operating cycle explained above will be repeated while continuously shifting the luminous path, as long as the adjustment of the monochromator is maintained at the same luminous frequency. Upon changing the luminous frequency by turning the knob 68 the consequent alteration of the luminous frequency will give rise to a corresponding change in the potential of the collecting electrode 15. Assume, for example, that the change of the luminous frequency causes an increase in said potential. During the reference period this potential increase will involve a corresponding voltage increase at the change-over switch 22 whereby the control arrangement is actuated to drive the potential of grid 39 negatively to an extent corresponding to said voltage increase at the change-over switch 22, whereby the A. C. impedance of tube 40 is increased correspondingly which, in its turn, causes lowering of the operative voltage of the photomultiplier to an extent such as to reset the potential at the collecting electrode 15 and thus the voltage at the change-over switch 22 to the same value as that prevailing before the luminous frequency change. During the subsequent measuring period, in the manner described, operative voltage of the photomultiplier will be maintained at the value to which it was adjusted during the preceding reference period. Thus the intensity value of the recent luminous frequency will be measured in relation to the same reference value as was obtained when measuring the preceding luminous frequency. Upon successively adjusting the monochromator to other luminous frequencies the operative voltage of the photomultiplier will be similarly adjusted in dependence of the luminous intensity values in such a manner that the voltage at the change-over switch 22 during the reference period will be maintained constant at all luminous frequencies. Thus the measurement of the intensity of the light emitted from the specimen will always be effected in relation to a stable reference value independent of varying source-emission energy, photomultiplier response, reference object transmission, etc. at different luminous frequencies. During the adjustment of the monochromator the recording medium at the recording device is moved in synchronism with the adjustment mechanism of the monochromator whereby the stylus is caused to draw a continuous graph representing percent or fractional transmittance or absorbance of the specimen as a function of the luminous frequency measured in relation to a zero level and a reference or 100% level parallel with the abscissa. The monochromator is operated at a speed such as to cause the luminous intensity change not to overrun the shifting of the luminous path between any two periods of measurement.

Upon each passage of the change-over switch 22 through the intermediate position $t_2$ the capacitor 23 is grounded, and at the same time the light from the monochromator is screened off by the shield or screen 18. This causes conversion of the A. C. impulses into a pulsating D. C. voltage having its zero level at ground potential. This involves the important additional advantage that the detrimental effects on the result of the measurement caused by the so-called dark current arising in the photomultiplier will be eliminated, whereby a true and stable "zero" will be continuously maintained. It will be seen that such dark currents might otherwise give rise to error voltages on the capacitor 23 which would be added to the reference and measurement values and thus give rise to incorrect measurements by variably displacing the "zero" point. By connecting the capacitor 23 to earth in the intermediate position $t_2$ these detrimental effects will be excluded.

It has been assumed in the foregoing description that the impulse peaks applied through the lead 30 and superimposed on the D. C. voltage produced exceed the threshold value or bias of the diode 31. However, should said impulse peaks not reach the threshold value, then the control amplifier 35 and the rectifier 38 will remain in their inactive state whereby the relative grid bias of tube 40 is reduced to cause a corresponding progressive increase in the operating voltage of the photomultiplier until the potential of the collector 15 reaches a sufficient value to cause the peak voltage level on the lead 30 to exceed the threshold value or bias of the diode 31 whereupon the control arrangement will be rendered operative in the manner described in the foregoing.

Spaced above the various sections of the circuit arrangement of Fig. 1 the approximate waveforms of the impulses produced in the corresponding sections are illustrated. Thus, in the instrument amplifier 20 alternate measurement and reference impulses 70 and 71, respectively, of square waveform are produced, the reference impulses 71 being substantially uniform in amplitude while the amplitude of the measurement impulses varies with the intensity of the light coming from the specimen. In the section containing the circuit elements 25, 26 the measurement impulses are converted into a D. C. voltage varying cyclically with the measurement impulses and produced by the alternate charging and discharging of capacitor 23 through the measuring arrangement. The section of the graph corresponding to the circuit section containing the circuit elements 32, 33 illustrates the related conversion of the reference impulses into a correspondingly varying D. C. voltage produced by the action of the capacitor 32 being charged at the occurrence of each impulse and then discharged through resistor 33. The peaks of the impulses illustrated in the last-mentioned section and superimposed on the D. C. voltage are illustrated specifically in the section of the graph corresponding to the input terminals of the control amplifier. The next succeeding section corresponding to the output terminals of the control amplifier illustrates the last-mentioned voltage peaks after amplification. The final section of the graphic representation illustrates the rectified impulses.

Referring now to Fig. 4 of the accompanying drawing, this figure illustrates a modified construction of the arrangement shown in Fig. 1 according to which the operating voltage of the photoelectric cell is maintained constant, the control required being accomplished by effecting a voltage control in the instrument amplifier 20. Fig. 4 illustrates a photoelectric cell 72 of the conventional type and connected to a source of current 73 through a resistor 74. The anode of the photoelectric cell is connected to one input terminal of the instrument amplifier 20 the other input terminal of which is connected to ground. The circuit section situated between the output terminals of the instrument amplifier and the output terminals of the rectifier 38 is identical with that illustrated in Fig. 1. The instrument amplifier 20 preferably comprises variable-mu tubes having one output terminal of the rectifier 38 connected thereto through a lead 75. This portion of the instrument amplifier is adapted to control the voltage applied to the change-over switch 22 so as to maintain the same constant during the reference periods thus to offer a stable reference value independent of the luminous frequency.

In the reactance tube circuit 46 described in the foregoing the reactance could be inductive rather than capacitive in nature, the arrangement being otherwise so devised that the circuit arrangement as a whole will operate in a manner similar to that including the capacitive circuit, i. e., so as to maintain the operating voltage of the photoelectric cell as adjusted during the reference period substantially unchanged during the subsequent period of measurement.

We claim as our invention:

1. In an apparatus for measuring an optical characteristic of a sample as a function of a reference, the combination of: a radiation source; a radiation detector; operating means for directing a beam of radiation from said source alternately to intercept a sample and a reference before being directed to said detector, said beam operating means including a support and spaced first and second mirrors fixed thereto, said first mirror being positioned to receive at oblique incidence the light beam from said source, said second mirror being positioned to receive said beam after reflectance from said first mirror at such incidence as to further reflect said beam toward said detector in a direction parallel to the direction of incidence on said first mirror; means for uniformly vibrating said support through an arcuate path while maintaining unchanged the directions of incidence of said beam upon said mirrors and maintaining unchanged the axial position of said beam reflected from said second mirror, the vibration of said support displacing the beam traversing the intermirror space between first and second path positions, said vibrating means including a parallelogram linkage having a base spaced from said support, a pair of frame members spaced from each other, and resilient means hinging said base, said support and said frame members together as the sides of a parallelogram; and means for supporting said sample in said intermirror space to intercept said beam in one of said path positions.

2. A spectrophotometer according to claim 1 including fixed means for interrupting said beam in said intermirror space at a position between said first and second path positions.

3. In an apparatus for measuring an optical characteristic of a sample as a function of a reference, the combination of: a radiation source; a radiation detector; operating means for directing a beam of radiation from said source alternately to intercept a sample and a reference before being directed to said detector, said beam operating means including a support and spaced first and second mirrors fixed thereto, said first mirror being positioned to receive at oblique incidence the light beam from said source, said second mirror being positioned to receive said beam after reflectance from said first mirror at such incidence as to further reflect said beam toward said detector in a direction parallel to the direction of incidence on said first mirror; means for uniformly vibrating said support through an arcuate path while maintaining unchanged the directions of incidence of said beam upon said mirrors and maintaining unchanged the axial position of said beam reflected from said second mirror, the vibration of said support displacing the beam traversing the intermirror space between first and second path positions, said vibrating means including a parallelogram linkage having a base spaced from said support, a pair of frame members spaced from each other, and means hinging said base, said support and said frame members together as the sides of a parallelogram; resilient means restraining the amplitude of vibration of said support and connected to said support; and means for supporting said sample in said intermirror space to intercept said beam in one of said path positions.

4. In a spectrophotometer for measurement of transmission or reflection of a sample as a function of a reference, said spectrophotometer including: a light source; a photoelectric measuring device; an operating means for directing a light beam originating from said source to intercept alternately said sample and said reference before being directed to said photoelectric measuring device, said operating means including a beam-shifting means comprising a support and spaced first and second mirrors fixed thereto, said first mirror being positioned to intercept obliquely the incident light beam originating from said source, said second mirror being positioned to receive the beam reflected from said first first mirror after it has traversed the intermirror space to further reflect such beam toward said photoelectric measuring device in a direction parallel to the direction of incidence of said incident light beam upon said first mirror, said operating means including means for vibrating said support to shift the beam traversing said intermirror space between first and second path positions while maintaining the axis of the beam reflected from said second mirror toward said photoelectric measuring device substantially unchanged, said operating means including means for supporting said sample in said intermirror space to intercept said beam therein in one of said path positions; an amplifier having an input connected to said photoelectric measuring device, the amplifier output signal pulsing in step with the light reaching said photoelectric measuring device from said sample and said reference; a reference circuit; a measuring circuit; including signal indicating means; a switch means including a switch member movable between first and second positions through an intermediate position, said switch means including first and second contact means respectively connecting the amplifier output to said reference and measuring circuits when said switch member is in said first and second positions, whereby said indicating means indicates the output generated by said amplifier only during the intervals when said support is in said one path position, said switch means including an intermediate contact means for zeroing said amplifier output signal when said switch member is in said intermediate position; means for operatively connecting said switch member to said means for vibrating said support to operate said switch member in step with said beam-shifting means in such relation that said switch member is in said intermediate position when said beam in said intermirror space is between said first and second path positions; and means for interrupting said beam at a position between said first and second path positions and synchronously with passage of said switch member through said intermediate position.

5. A spectrophotometer as defined in claim 4 in which the amplifier output signal pulses relative to a circuit reference point, and including means for connecting the amplifier output to said circuit reference point each time said intermediate contact means of said switch means moves to said intermediate position.

6. A spectrophotometer as defined in claim 4 in which the amplifier output signal pulses relative to a circuit reference return point to which the sample and reference output signals are referred, and including means for returning the level of the amplifier output signal to that of the circuit reference return point through said intermediate contact means each time said switch member assumes said intermediate position.

7. A spectrophotometer as defined in claim 4 in which said reference circuit includes means for adjusting the amplifier voltage applied to said switch means to a constant value independent of change in wavelength of the light reaching said photoelectric measuring device.

8. A spectrophotometer as defined in claim 7 in which said photoelectric measuring device comprises a photomultiplier and in which said means for adjusting the amplifier voltage includes means for varying the voltage applied to said photomultiplier.

9. In a spectrophotometer for measurement of transmission or reflection of a sample as a function of a reference, said spectrophotometer including: a light source; a photocell; an amplifier connected to the output of said photocell, said amplifier having an output capacitor charged with a potential which changes relative to a circuit reference point with the output of said amplifier; vibratory means for impinging a light beam originating from said source alternately upon said sample and said reference before reaching said photocell, the charge applied to said output capacitor being successively the result of light reaching said photocell from said reference during a reference period of a complete cycle of said vibratory means and from said sample during a sample period of said complete cycle; switch means for connecting said output capacitor to said circuit reference point twice during each complete cycle, intervening the periods of receipt of light by said photocell from said reference and sample, and vice versa; and means for operating said switch means in synchronism with said vibratory means.

10. A spectrophotometer as defined in claim 9 in which said switch means includes a switch member and said operating means includes means for moving said switch member to and fro between first and second positions through an intermediate position therebetween and in step with said vibratory means.

11. A spectrophotometer as defined in claim 9 including a shield in the path of said light beam to interrupt same between the alternate impingements of said beam on said sample and said reference.

12. In combination: a photocell; means for alternately directing light to said photocell along two paths with an intermediate dark period during which no light reaches said photocell; an amplifier having an input circuit connected to the output of said photocell so that the amplifier output signal pulses in step with the operation of said light directing means; a reference circuit; a measuring circuit including signal indicating means; a switch means including a switch member movable between first and second positions through an intermediate position, said switch means including first and second contact means respectively connecting the amplifier output to said reference and measuring circuits when said switch member is in said first and second positions, said switch means including an intermediate contact means for zeroing said amplifier output signal when said switch member is in said intermediate position; and means for operating said light directing means and said switch means in step with each other to zero sad amplifier output signal during said dark period, and to cause said indicating means to indicate said amplifier output signal only when said light directing means directs light along one of said paths.

13. In combination: a photocell; beam-shifting means for alternately directing light to said photocell along two paths; an amplifier having an input circuit connected to the output of said photocell so that the amplifier output signal pulses relative to a circuit reference point in step with the operation of said beam-shifting means; a reference circuit; a measuring circuit including signal indicating means; a three-position oscillatory switch having a switch member oscillating between first and second positions through an intermediate position; means for connecting said reference circuit to the output of said amplifier when said switch member is in said second position; means for connecting said measuring circuit to said output of said amplifier when said switch member is in said first position; means for connecting said output of said amplifier to said circuit reference point each time said switch member passes through said intermediate position; means for oscillating said switch member in step with said beam-shifting means, whereby said indicating means indicates said amplifier output signal only when said beam-shifting means directs light along one of said paths; and means for interrupting said beam at a position between said paths and synchronously with passage of said switch member through said intermediate position, whereby the amplifier input circuit is influenced only by the dark current of said photocell when the amplifier output is connected to said circuit reference point.

14. A combination as defined in claim 13 in which said switch includes contact elements on opposite sides of said switch member and respectively engaging a first portion thereof when the switch member is in said first and second positions, said contact elements being respectively connected to said control and measuring circuits, and in which said switch includes two auxiliary contact elements biased for limited motion toward each other and positioned on opposite sides of said switch member to simultaneously engage a second portion thereof exclusively when said switch member is in said intermediate position and to alternately disengage such second portion upon movement of said switch member from said intermediate position in opposite directions, such disengagement taking place before said switch member reaches either of said first and second positions.

15. A combination as defined in claim 14 in which one of said auxiliary contact elements is connected to said circuit reference point, and in which the other of said auxiliary contact elements is connected to the output of said amplifier and to said first portion of said switch member.

References Cited in the file of this patent

UNITED STATES PATENTS

| | | |
|---|---|---|
| 2,326,878 | Muller | Aug. 17, 1943 |
| 2,551,833 | Ewing | May 8, 1951 |
| 2,670,648 | Miller et al. | Mar. 2, 1954 |

FOREIGN PATENTS

| | | |
|---|---|---|
| 29,747 | Great Britain | Dec. 24, 1913 |
| 666,552 | Germany | Oct. 22, 1938 |

UNITED STATES PATENT OFFICE
Certificate of Correction

Patent No. 2,868,060                         January 13, 1959

Karl Aron Lennart Åkerman et al.

It is hereby certified that error appears in the printed specification of the above numbered patent requiring correction and that the said Letters Patent should read as corrected below.

Column 2, line 42, for "deflected" read —reflected—; column 6, lines 14 and 15, for "simultaneous" read —simultaneously—; column 9, line 69, strike out "first", second occurrence; column 10, line 11, after "circuit", second occurrence, strike out the semicolon; column 11, line 31, for "sad" read —said—; line 32, after "period" strike out the comma.

Signed and sealed this 28th day of April 1959.

[SEAL]

Attest:
T. B. MORROW,
*Attesting Officer.*

ROBERT C. WATSON,
*Commissioner of Patents.*